United States Patent
Ooba et al.

(10) Patent No.: US 11,904,478 B2
(45) Date of Patent: Feb. 20, 2024

(54) SIMULATION DEVICE AND ROBOT SYSTEM USING AUGMENTED REALITY

(71) Applicant: FANUC CORPORATION, Yamanashi (JP)

(72) Inventors: Masafumi Ooba, Yamanashi (JP); Taiki Katagiri, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 235 days.

(21) Appl. No.: 17/020,815

(22) Filed: Sep. 15, 2020

(65) Prior Publication Data

US 2021/0154844 A1 May 27, 2021

(30) Foreign Application Priority Data

Nov. 22, 2019 (JP) ................................ 2019-211748

(51) Int. Cl.
| | |
|---|---|
| *B25J 9/16* | (2006.01) |
| *G06T 19/00* | (2011.01) |
| *B25J 19/02* | (2006.01) |
| *G06T 19/20* | (2011.01) |

(52) U.S. Cl.
CPC ........... *B25J 9/1671* (2013.01); *B25J 9/1666* (2013.01); *B25J 9/1689* (2013.01); *B25J 19/023* (2013.01); *G06T 19/006* (2013.01); *G06T 19/20* (2013.01)

(58) Field of Classification Search
CPC ...... B25J 9/1671; B25J 9/1666; B25J 9/1689; B25J 19/023; B25J 9/1697; B25J 3/00; B25J 9/1605; B25J 19/00; B25J 19/04; G06T 19/006; G06T 19/20; G05B 2219/39449; G05B 2219/39451; G05B 19/42

See application file for complete search history.

(56) References Cited

U.S. PATENT DOCUMENTS

| | | | | |
|---|---|---|---|---|
| 10,775,918 B2 * | 9/2020 | Kim | ...................... | G06F 3/0446 |
| 10,878,591 B2 * | 12/2020 | Meess | ................... | G06V 10/22 |
| 2004/0041822 A1 * | 3/2004 | Iizuka | ................... | G06T 19/006 |
| | | | | 348/E5.022 |

(Continued)

FOREIGN PATENT DOCUMENTS

| | | | | |
|---|---|---|---|---|
| CN | 108161904 B | * 12/2019 | ............ | B25J 9/0081 |
| JP | H03-022106 A | 1/1991 | | |

(Continued)

OTHER PUBLICATIONS

Interactive_Occlusion_and_Collision_of_Real_and_Virtual_Objects. pdf (Year: 1995).*
CN-108161904-B translation (Year: 2019).*

*Primary Examiner* — Jeff A Burke
*Assistant Examiner* — Kyle T Johnson
(74) *Attorney, Agent, or Firm* — HAUPTMAN HAM, LLP (57) ABSTRACT

A simulation device includes an image sensor which captures an image of a real space including an actual robot and a peripheral device arranged at the periphery of the actual robot, an augmented reality display section which displays a virtual robot overlaid on the actual robot shown in the captured image, a workpiece management section which manages a position of a moving workpiece, and a motion control section which controls a motion of the virtual robot on the basis of the position of the workpiece.

13 Claims, 5 Drawing Sheets

(56) References Cited

U.S. PATENT DOCUMENTS

| | | | | |
|---|---|---|---|---|
| 2016/0086343 A1* | 3/2016 | Namiki | ................. | G06V 10/60 |
| | | | | 348/135 |
| 2018/0018826 A1 | 1/2018 | Maier et al. | | |
| 2018/0311825 A1* | 11/2018 | Yamamoto | ............. | B25J 9/1656 |
| 2021/0023694 A1* | 1/2021 | Chen | ...................... | B25J 9/0081 |
| 2021/0035363 A1* | 2/2021 | Sugaya | ................. | B25J 9/1671 |
| 2021/0154826 A1* | 5/2021 | Watanabe | ................ | B25J 19/04 |
| 2021/0331311 A1* | 10/2021 | Fu | ........................ | G06V 10/764 |

FOREIGN PATENT DOCUMENTS

| | | | |
|---|---|---|---|
| JP | 2004243516 A | 9/2004 | |
| JP | 2006-190228 A | 7/2006 | |
| JP | 2008-033419 A | 2/2008 | |
| JP | 2013-136123 A | 7/2013 | |
| JP | 2013-191128 A | 9/2013 | |
| JP | 2014-180707 A | 9/2014 | |
| JP | 2017-094407 A | 6/2017 | |
| JP | 6385627 B1 | 9/2018 | |
| JP | 201925620 A | 2/2019 | |
| JP | 201942843 A | 3/2019 | |
| WO | WO-2021101522 A1 * | 5/2021 | ............ B25J 9/1671 |

\* cited by examiner

SIMULATION DEVICE AND ROBOT SYSTEM USING AUGMENTED REALITY

RELATED APPLICATIONS

The present application claims priority to Japanese Application Number 2019-211748, filed Nov. 22, 2019, the disclosure of which is hereby incorporated by reference herein in its entirety.

BACKGROUND OF THE INVENTION

1. Field of the Invention

The present invention relates to a simulation device and a robot system, and in particular, relates to a simulation device and a robot system using augmented reality.

2. Description of Related Art

When a predetermined operation is performed using a robot, it is customary to perform an offline simulation in advance and thereafter carry out on-site motion confirmation with an actual robot. Regarding such robot simulation, for example, the literature described hereinafter is well known.

Japanese Unexamined Patent Publication (Kokai) No. 2004-243516 discloses a method for fading-in information generated by a computer onto a real-world image detected by an image reception device of a vision device. In this method, judgement is made regarding the position and orientation or posture of an image reception unit, and in accordance with this determination, information specific to the robot (reference coordinate system, robot axis, etc.) is superimposed on the real-world image.

Japanese Patent No. 6385627 discloses that three-dimensional data of an alignment coordinate axis including a straight line passing through control points set on a robot is displayed in a virtual space defined by three-dimensional data of a structure on the basis of the three-dimensional data of the robot and the three-dimensional data of the structure.

Japanese Unexamined Patent Publication (Kokai) No. 2019-25620 and Japanese Unexamined Patent Publication (Kokai) No. 2019-42843 disclose that a virtual robot is displayed overlaid on an actual robot shown in an image, the virtual robot is moved, and thereafter, the actual robot is moved. Furthermore, displaying of a virtual workpiece is also described.

SUMMARY OF THE INVENTION

The situation of the site where the robot is used is not always the same as the situation when the simulation is performed offline. Thus, when the robot is actually moved, the robot may interfere with peripheral devices. In particular, in the case in which a robot performs an operation on a moving workpiece, since the motion path of the robot taught in advance is corrected based on the position of the workpiece, it is difficult to understand how the robot will actually move in a simulation in advance.

Furthermore, when a robot is moved for teaching purposes, an operation button may be pressed incorrectly or the robot may be moved without noticing that the motion speed of the robot was set to high speed, which may also cause the robot to interfere with peripheral devices.

A technology with which it can be understood, in a simulation of a robot performing an operation on a moving workpiece, whether or not a robot will interfere with peripheral devices is desired.

An aspect of the present disclosure provides a simulation device comprising an image sensor which captures an image of a real space including an actual robot and a peripheral device arranged at the periphery of the actual robot, an augmented reality display section which displays a virtual robot overlaid on the actual robot shown in the captured image, a workpiece management section which manages a position of a moving workpiece, and a motion control section which controls a motion of the virtual robot on the basis of the position of the workpiece.

Another aspect of the present disclosure provides a simulation device comprising an image sensor which captures an image of a real space including an actual robot and a peripheral device arranged at the periphery of the actual robot, an augmented reality display section which displays a virtual robot overlaid on the actual robot shown in the captured image, an indication section which indicates a motion of the virtual robot on the image, and a motion control section which controls the motion of the virtual robot on the basis of the indication of the indication section.

Yet another aspect of the present disclosure provides a robot system comprising an actual robot, an image sensor which captures an image of a real space including the actual robot and a peripheral device arranged at the periphery of the actual robot, an augmented reality display section which displays a virtual robot overlaid on the actual robot shown in the captured image, a workpiece management section which manages a position of a moving workpiece, and a motion control section which controls a motion of the virtual robot on the basis of the position of the workpiece.

Yet another aspect of the present disclosure provides a robot system comprising an actual robot, an image sensor which captures an image of a real space including the actual robot and a peripheral device arranged at the periphery of the actual robot, an augmented reality display section which displays a virtual robot overlaid on the actual robot shown in the captured image, an indication section which indicates a motion of the virtual robot on the image, and a motion control section which controls the motion of the virtual robot on the basis of the indication of the indication section.

DETAILED DESCRIPTION

The embodiments of the present disclosure will be described below with reference to the attached drawings. In the drawings, the same or similar constituent elements are assigned the same or similar reference signs. Furthermore, the embodiments described below do not limit the technical scope of the invention or the definitions of the terms described in the claims. Note that in the present description, the term "workpiece" encompasses an actual workpiece and a virtual workpiece, and in the present description, the term "robot" encompasses an actual robot and a virtual robot.

Figure 1:
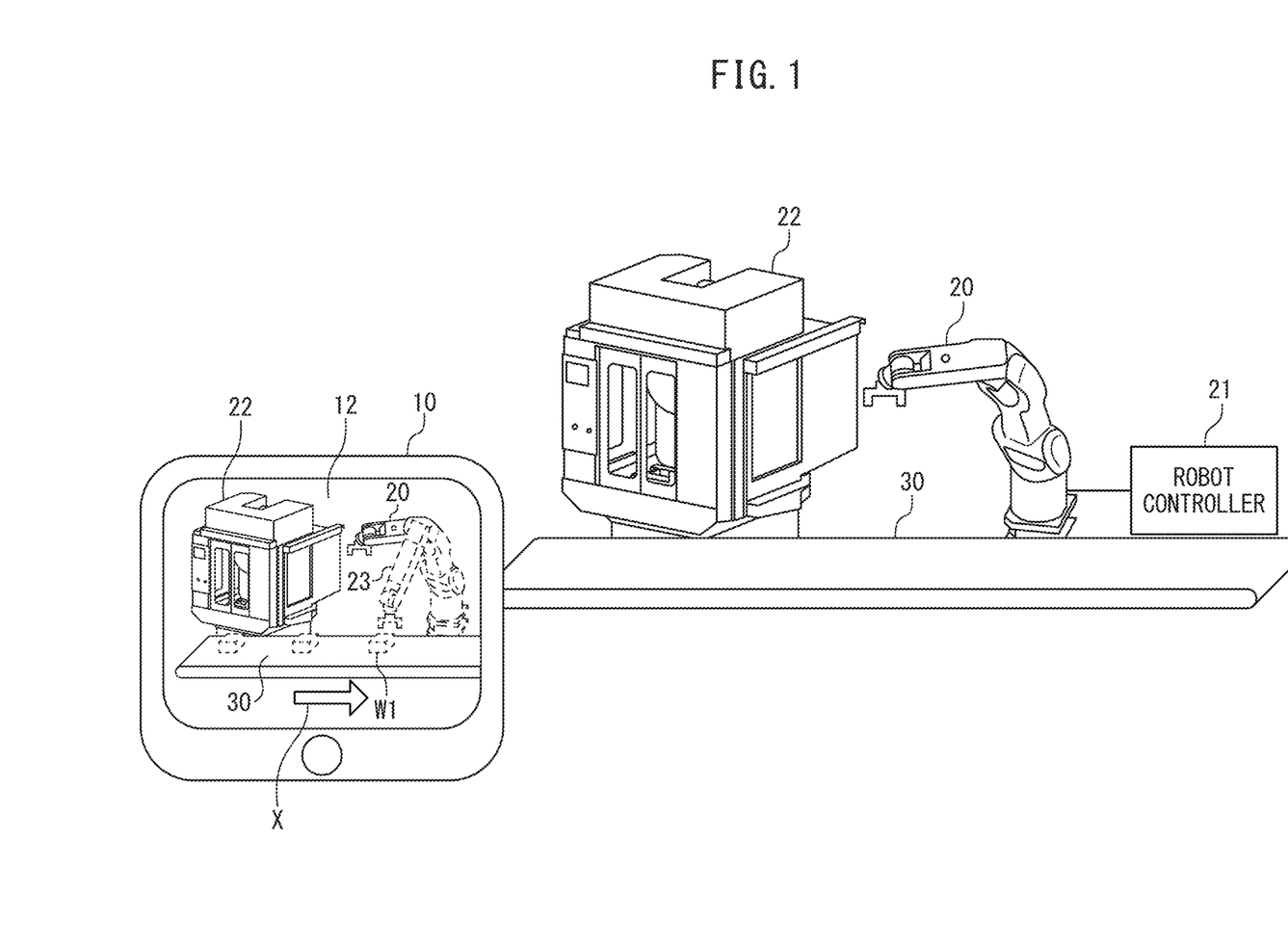
FIG. 1 is a schematic structural view of a simulation device according to an embodiment.

FIG. 1 shows the schematic structure of a simulation device 10 according to the present embodiment. The simulation device 10 comprises a computing device including a processor such as, for example, a CPU (central processing unit) or an MPU (micro processing unit). The simulation device 10 may be a mobile terminal such as a tablet, smartphone, wearable device, or laptop, or may be a fixed terminal such as a desktop. The simulation device 10 is an augmented reality display device which superimposes a virtual object on an image of a real space captured by an image sensor (not shown) and may also have the function of a robot teaching device which generates a motion program of the robot. The simulation device 10 comprises an augmented reality display section 12 comprising a processor which performs augmented reality processing, a display panel, etc. In order to overlay a virtual object on a captured image, the augmented reality display section 12 sets three-dimensional data of the virtual object in advance, sets a characteristic portion or marker of an actual object, calibrates the image sensor, and acquires the relative relationship (relative position and relative posture) between the characteristic portion or marker and the image sensor in advance. Further, the augmented reality display section 12 detects the position and posture of the characteristic portion or marker from an actually captured image, and displays a virtual object overlaid on the image on the basis of the relative relationship between the detected position and posture of the characteristic portion or marker and the image sensor acquired in advance.

The augmented reality display device 12 of the present example captures an image in which an actual robot 20 and a peripheral device 22 arranged at the periphery of the actual robot 20 are shown, and displays a virtual robot 23 overlaid on the actual robot 20 shown in the captured image. The actual robot 20 and the virtual robot 23 are industrial robots such as, for example, articulated robots or parallel link robots, and may be humanoid or the like. Furthermore, the peripheral device 22 is, for example, a machine tool, and includes arbitrary objects arranged at the periphery of the actual robot 20. A transport section 30 which transports actual workpieces (not shown) may be shown in the captured image. The transport section 30 encompasses, for example, a conveyor, an AGV (automated guided vehicle), etc.

The augmented reality display section 12 of the present example also displays a virtual workpiece W1 which is transported by the transport section 30 and which moves in the direction of arrow X overlaid on the image, and displays the motion of the virtual robot 23 with respect to the virtual workpiece W1. At this time, virtual workpieces W1 may flow at the same movement speed and supply amount in the same manner as actual operations. As a result, even in the case in which it is difficult to reproduce actual workpiece flow in the same manner as actual operations, since the motion of the virtual robot 23 with respect to the virtual workpiece W1 can be reproduced on the image of the real space, presence or absence of interference of the actual robot 20 with the peripheral device 22 can be understood in advance. Note that, when performing simulation, a robot controller 21 may machine-lock the actual robot 20. As a result, even in the case in which the actual robot 20 is erroneously moved for teaching purposes, the interference of the actual robot 20 with the peripheral device 22 can be prevented.

Figure 2:
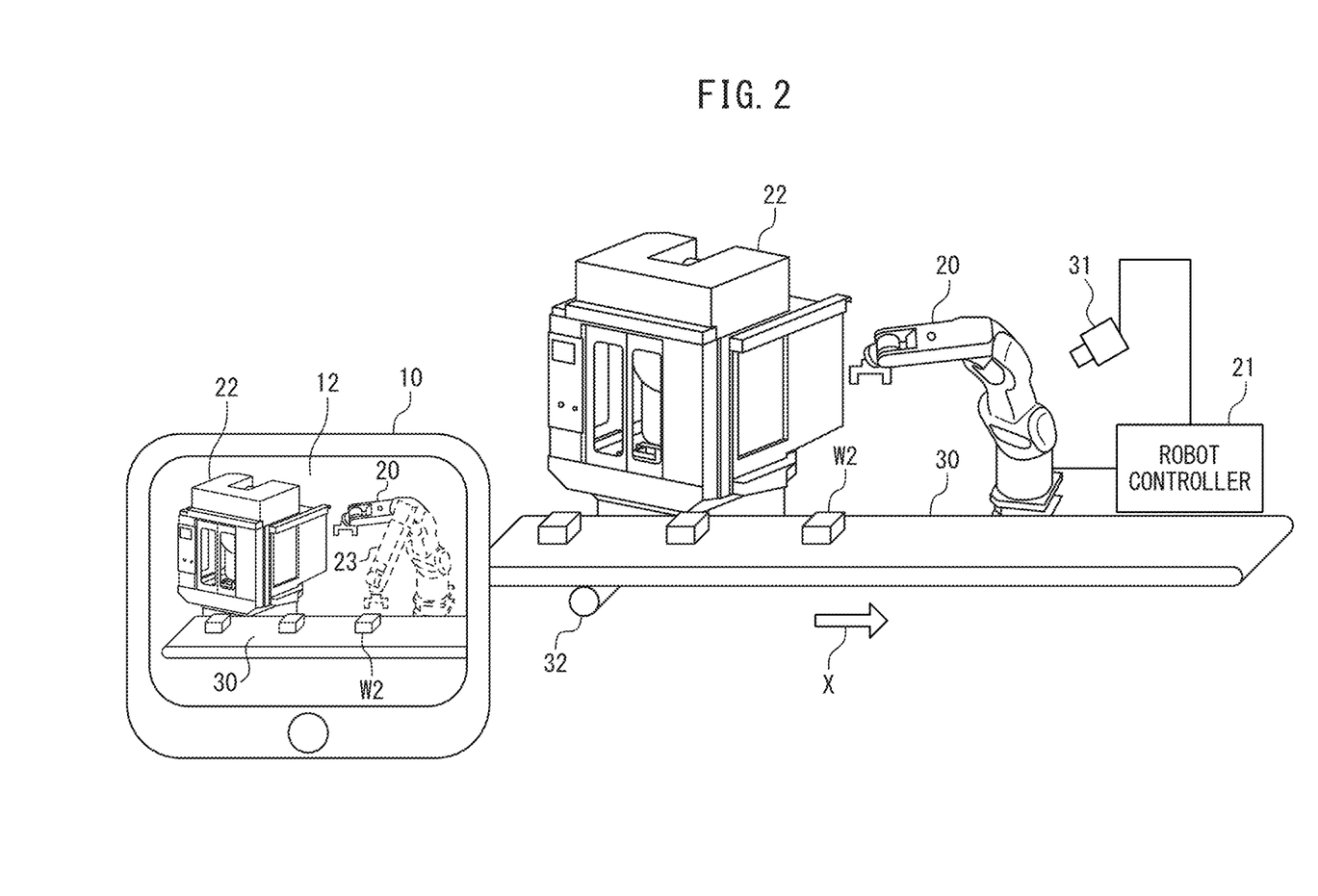
FIG. 2 is a schematic structural view showing a modified example of the simulation device.

FIG. 2 shows a modified example of the simulation device 10. The simulation device 10 of the present example differs from that described above in that an image obtained by flowing actual workpieces W2 is captured instead of flowing virtual workpieces W1. The simulation device 10 moves the virtual robot 23 with respect to the actual workpiece W2 shown in the image. The simulation device 10 may detect the position and, if necessary, the movement amount of the actual workpiece W2 on the basis of at least one of the information of a first detection sensor 31 and the information of a second detection sensor 32. The first detection sensor 31 is a fixed camera which is capable of detecting, for example, the position and movement amount of the actual workpiece W2, but may be a photoelectric sensor, contact sensor, etc., which detects the arrival of the actual workpiece W2 in the case in which the movement amount of the actual workpiece W2 is known. Furthermore, the second detection sensor 32 is a rotary encoder attached to, for example, the rotary shaft of the transport section 30, and may be combined with the first detection sensor 31, such as a photoelectric sensor or contact sensor, in the case in which the movement amount of the actual workpiece W2 is not known. By detecting the position and, if necessary, the movement amount of the actual workpiece W2, the motion of the virtual robot 23 with respect to the actual workpiece W2 can be displayed. In the case in which the flow of actual workpieces W2 can be reproduced in the same manner as actual operations, by displaying the motion of the virtual robot 23 with respect to the actual workpiece W2, the presence or absence of the interference of the actual robot 20 with the peripheral device 22 can be more accurately confirmed.

Figure 3:
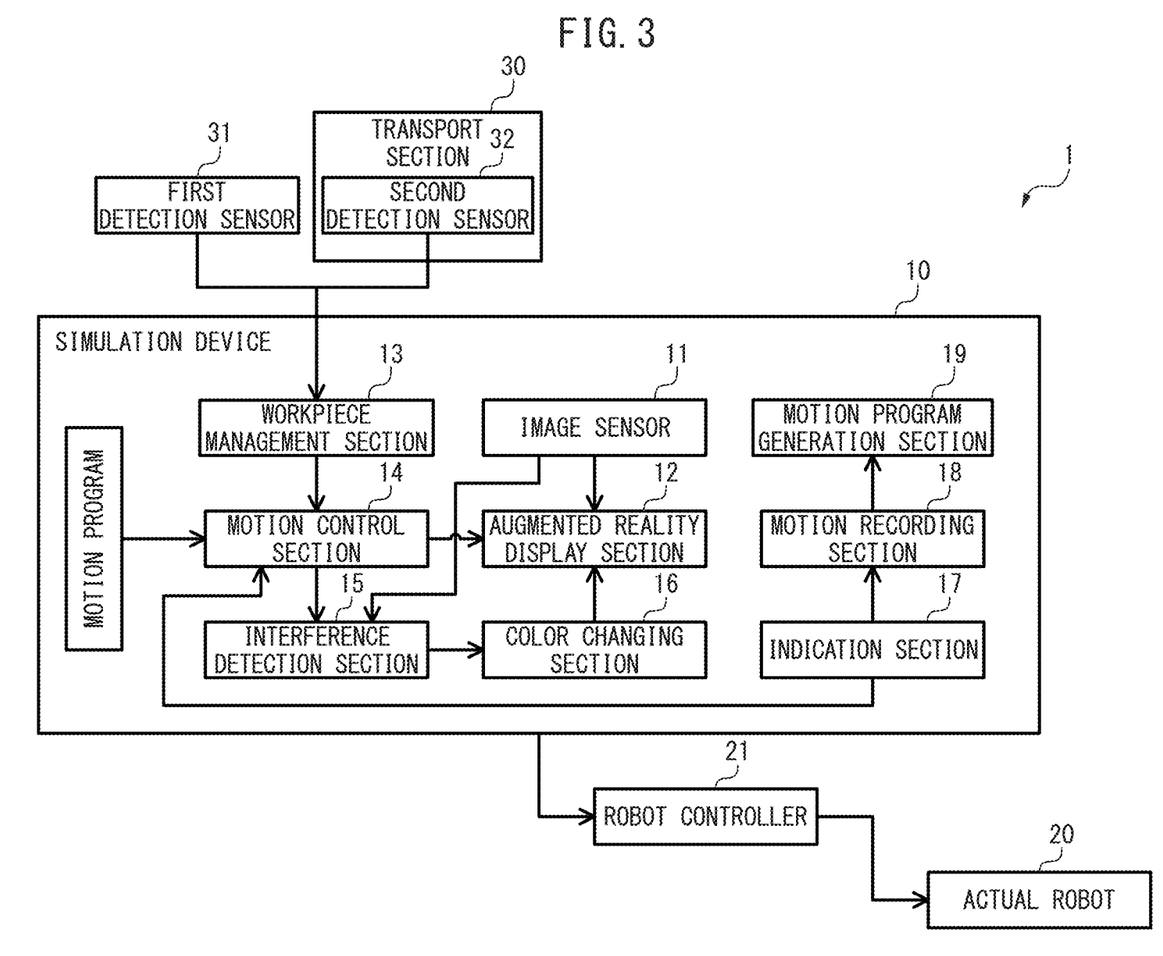
FIG. 3 is a functional block diagram of a robot system according to an embodiment.

FIG. 3 shows the functional blocks of a robot system 1 according to the present embodiment. Note that the "sections" in the functional blocks are constituted by at least one of hardware and software. The robot system 1 comprises an actual robot 20 and a robot controller 21 in addition to the simulation device 10. The simulation device 10 transmits the simulated robot motion program to the robot controller 21. The robot controller 21 controls the actual robot 20 in accordance with the received motion program.

In addition to the image sensor 11 and the augmented reality display section 12, the simulation device 10 comprises a workpiece management section 13 which manages the position of the moving workpiece, and a motion control section 14 which controls the motion of the virtual robot on the basis of the position of the workpiece. When virtual workpieces W1 flow as shown in FIG. 1, the workpiece management section 13 manages the position of the virtual workpiece W1, which changes continuously, on the basis of the preset initial position, movement direction, movement amount, etc., of the virtual workpiece W1. Conversely, when actual workpieces W2 flow as shown in FIG. 2, the workpiece management section 13 manages the position of the actual workpiece W2, which changes continuously, on the basis of the information of at least one of the first detection sensor 31 and the second detection sensor 32. The motion control section 14 controls the motion of the virtual robot 23 on the basis of the position of the virtual workpiece W1 or the actual workpiece W2.

The simulation device 10 may further comprise an interference detection section 15 which detects presence or absence of interference of the virtual robot 23 with the peripheral device 22. Prior to detecting the presence or absence of interference, three-dimensional data of the peripheral device 22 may be set in advance, and when the image sensor 11 is a three-dimensional sensor such as a TOF (time of flight) sensor or a laser scanner, the three-dimensional data of the peripheral device 22 may be acquired in advance from information of the image sensor 11. The interference detection section 15 is capable of detecting the presence or absence of the interference of the virtual robot 23 with the peripheral device 22 using a known interference detection method. For example, the interference detection section 15 may project a convex polyhedron having a simplified shape of the peripheral device 22 and a convex polyhedron having a simplified shape of the virtual robot 23 onto the XYZ planes, determine the intersection of the two convex polyhedrons formed by the projection using a known plane scanning method, and when intersection is detected in all of the XYZ planes, determine that there is interference.

The simulation device 10 may further comprise a color changing section 16 which changes the color of the virtual robot 23 when the interference is detected. For example, the color changing section 16 changes the color of the virtual robot 23 to red, and the augmented reality display section 12 displays the virtual robot 23 for which the color has been changed to red overlaid on the image. As a result, the presence or absence of the interference of the actual robot 20 with the peripheral device 22 can be easily visually understood.

Figure 4:
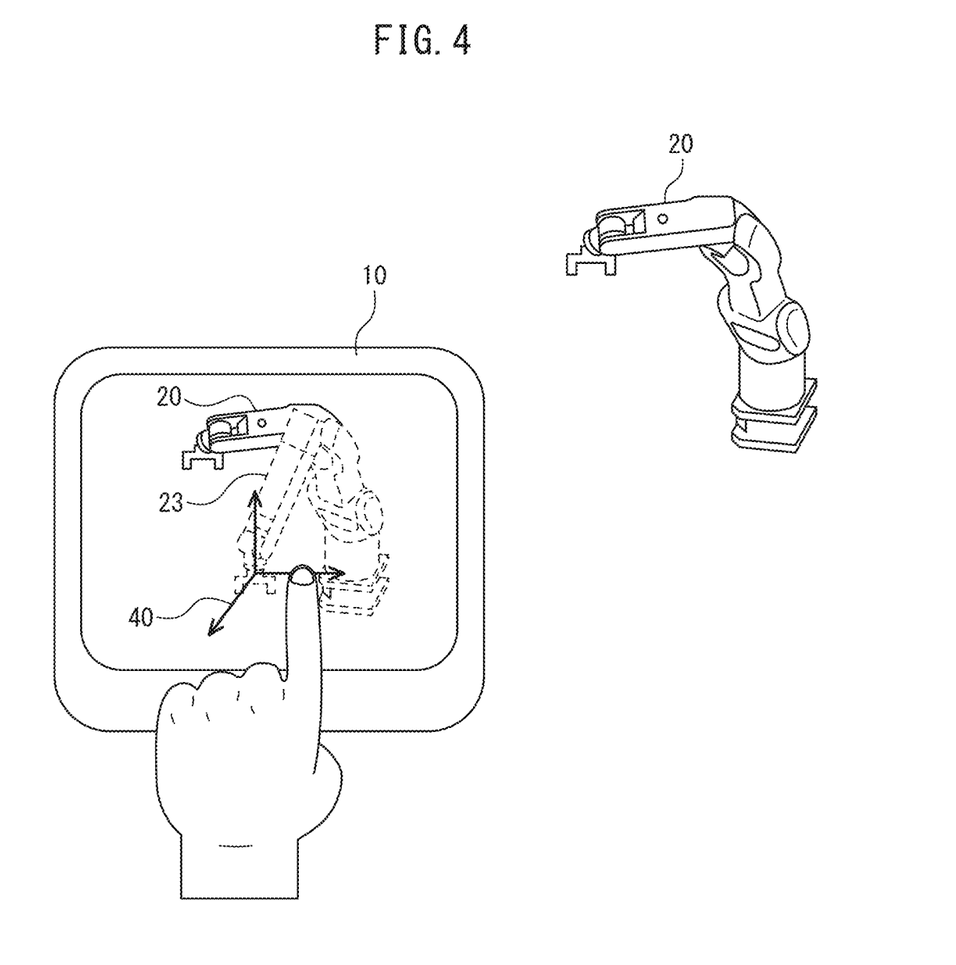
FIG. 4 is a view showing an operation cursor for indicating the motion of a virtual robot.

The simulation device 10 may further comprise an indication section 17 which indicates the motion of the virtual robot 23 on the image. The indication section 17 is constituted by, for example, a touch panel, processor, etc., and displays an operation cursor indicating the motion of the virtual robot 23 overlaid on the image. FIG. 4 shows an operation cursor 40. The operation cursor 40 is constituted by, for example, the XYZ axes using the origin in the tool coordinate system (for example, the tool center point (TCP) or the like) or an arbitrary control point as the origin. The indication section 17 moves the operation cursor 40 on the basis of information of the touch panel. The indication of the indication section 17 includes the position and posture of the virtual robot 23, and the motion control section 14 controls the motion of the virtual robot 23 on the basis of the indication of the indication section 17. The position of the virtual robot 23 may be, for example, the origin of a flange coordinate system, and the posture of the virtual robot 23 can be, for example, the orientation of the tool coordinate system with respect to the origin of a base coordinate system.

Referring again to FIG. 3, the simulation device 10 may further comprise a motion recording section 18 which records the motion of the virtual robot 23 on the basis of the indication of the indication section 17, and a motion program generation section 19 which generates a motion program of the robot on the basis of the recording of the motion. The simulation device 10 may again simulate the generated motion program in augmented reality, or may transmit the generated motion program to the robot controller 21. The robot controller 21 controls the actual robot 20 on the basis of the received motion program.

Figure 5:
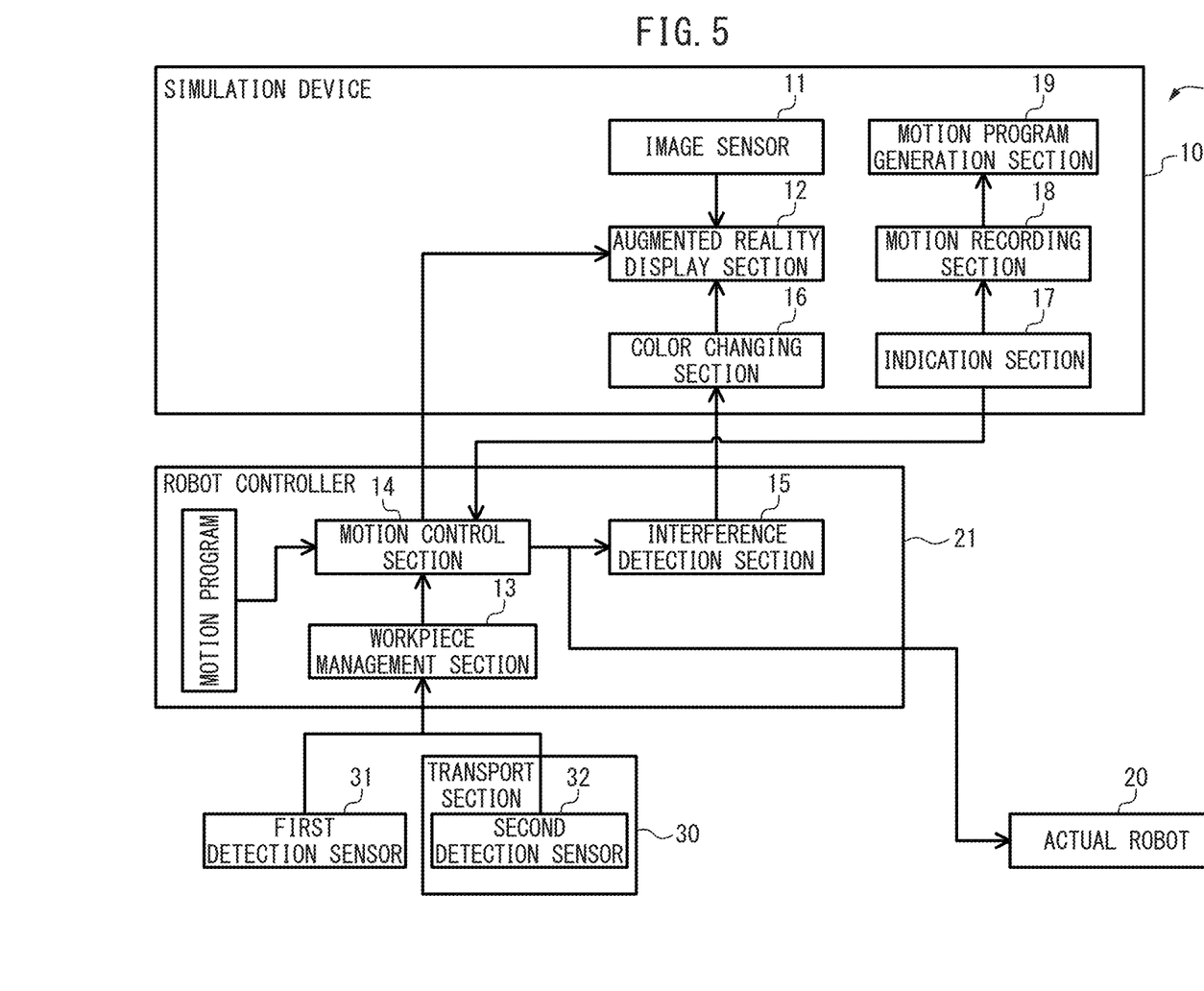
FIG. 5 is a functional block diagram of a modified example of the robot system.

FIG. 5 shows a modified example of the robot system 1. The robot system 1 of the present example differs from that described above in that the workpiece management section 13, motion control section 14, and interference detection section 15 are provided not in the simulation device 10 but in the robot controller 21. By adopting such a configuration, the simulation device 10 can perform augmented reality simulation utilizing the existing functions of the robot controller 21.

According to the embodiments described above, the presence or absence of the interference of the actual robot 20 with the peripheral device 22 in a simulation in which a robot performs an operation on a moving workpiece can be understood in advance. As a result, since layout confirmation tasks can be carried out in the same situation as the time of on-site operation, operational man-hours are reduced.

The program for executing the flowchart described above may be recorded and provided on a computer-readable non-transitory recording medium, for example, a CD-ROM, etc.

It should be noted that though various embodiments have been described in the present description, the present invention is not limited to the embodiments described above, and various changes can be made within the scope described in the claims below.

The invention claimed is:

1. A simulation device, comprising:
   an image sensor which captures an image of a real space including an actual robot and a peripheral device arranged at a periphery of the actual robot,
   an augmented reality display section which displays a virtual robot and a virtual workpiece overlaid on the actual robot shown in the captured image,
   a workpiece management section which manages a position of a moving workpiece, wherein
      the moving workpiece is the virtual workpiece, and the workpiece management section manages the position of the virtual workpiece, which changes continuously, on a basis of a preset initial position, a movement direction, and a movement amount of the virtual workpiece, or
      the moving workpiece is an actual workpiece, and the workpiece management section manages the position of the actual workpiece, which changes continuously, on a basis of information of at least one of a first detection sensor and a second detection sensor, and
   a motion control section which controls a motion of the virtual robot on a basis of the position of the moving workpiece.

2. The simulation device according to claim 1, further comprising an interference detection section which detects presence or absence of interference of the virtual robot with the peripheral device.

3. The simulation device according to claim 2, further comprising a color changing section which changes a color of the virtual robot when the interference is detected.

4. The simulation device according to claim 1, further comprising a transport section which transports the actual workpiece, and the transport section is shown in the image.

5. A simulation device, comprising:
   an image sensor which captures an image of a real space including an actual robot and a peripheral device arranged at a periphery of the actual robot,
   an augmented reality display section which displays a virtual robot overlaid on the actual robot shown in the captured image,
   an indication section which indicates a motion of the virtual robot on the image, wherein the indication section includes a touch panel, the indication section displays an operation cursor indicating the motion of the virtual robot overlaid on the image of the touch panel, and moves the operation cursor on a basis of information of the touch panel, and
   a motion control section which controls the motion of the virtual robot on a basis of the indication of the indication section.

6. The simulation device according to claim 5, further comprising an interference detection section which detects interference of the virtual robot with the peripheral device.

7. The simulation device according to claim 6, further comprising a color changing section which changes a color of the virtual robot when the interference is detected.

8. The simulation device according to claim 5, wherein the indication of the indication section includes a position and posture of the virtual robot.

9. The simulation device according to claim 5, further comprising:
- a motion recording section which records the motion of the virtual robot on the basis of the indication of the indication section, and
- a motion program generation section which generates a motion program on a basis of a recording of the motion.

10. A robot system, comprising:
- an actual robot,
- an image sensor which captures an image of a real space including the actual robot and a peripheral device arranged at a periphery of the actual robot,
- an augmented reality display section which displays a virtual robot and a virtual workpiece overlaid on the actual robot shown in the captured image,
- a workpiece management section which manages a position of a moving workpiece, wherein
    the moving workpiece is the virtual workpiece, and the workpiece management section manages the position of the virtual workpiece, which changes continuously, on a basis of a preset initial position, a movement direction, and a movement amount of the virtual workpiece, or
    the moving workpiece is an actual workpiece, and the workpiece management section manages the position of the actual workpiece, which changes continuously, on a basis of information of at least one of a first detection sensor and a second detection sensor, and
- a motion control section which controls a motion of the virtual robot on a basis of the position of the moving workpiece.

11. The robot system according to claim 10, wherein the moving workpiece is the actual workpiece, and the robot system further comprises the first detection sensor which detects the position of the actual workpiece.

12. The robot system according to claim 11, wherein the first detection sensor further detects a movement amount of the actual workpiece.

13. A robot system, comprising:
- an actual robot,
- an image sensor which captures an image of a real space including the actual robot and a peripheral device arranged at a periphery of the actual robot,
- an augmented reality display section which displays a virtual robot overlaid on the actual robot shown in the captured image,
- an indication section which indicates a motion of the virtual robot on the image, wherein the indication section includes a touch panel, the indication section displays an operation cursor indicating the motion of the virtual robot overlaid on the image of the touch panel, and moves the operation cursor on a basis of information of the touch panel, and
- a motion control section which controls the motion of the virtual robot on a basis of the indication of the indication section.

* * * * *